(No Model.)

J. J. HICKS.
PHOTOGRAPHIC VIEW FINDER.

No. 525,654. Patented Sept. 4, 1894.

Attest.
Walter E. Allen.
S. Allen.

Inventor.
James J. Hicks.
By Knight Bros.
Attorneys.

UNITED STATES PATENT OFFICE.

JAMES J. HICKS, OF LONDON, ENGLAND.

PHOTOGRAPHIC VIEW-FINDER.

SPECIFICATION forming part of Letters Patent No. 525,654, dated September 4, 1894.

Application filed June 5, 1894. Serial No. 513,574. (No model.)

*To all whom it may concern:*

Be it known that I, JAMES JOSEPH HICKS, a subject of the Queen of Great Britain, residing at 8 Hatton Garden, in the city of London, England, have invented certain new and useful Improvements in View-Finders, of which the following is a specification.

The invention relates to that class of photographic cameras which are provided with a "view-finder" and with a level.

Heretofore the "view-finder" and the level have been two separate and distinct instruments fixed at different parts of the camera. This arrangement requires the eye of the operator to look first at one instrument and then at the other, thereby involving the liability of faulty pictures as, after having found the view in the focusing screen, the operator has to see to the level of the camera, or vice versa, and he will probably, after having adjusted the camera by the one instrument, disarrange such adjustment when adjusting it by the other instrument. According to my invention I obviate this inconvenience by so combining the two instruments that the proper line of sight for the one is also that for the other instrument, thereby enabling the adjustment of the camera by both instruments to be effected by a single line of sight. For this purpose instead of constructing the "view-finder" with the ordinary focusing screen, I use in lieu of the latter, a circular or other shaped level, having a transparent glass bottom and a plano-concave glass top or cover occupying the place of the ordinary focusing screen, and having its under or concave side ground; thus, when the operator looks at the level, he is enabled to adjust the camera by means of the air bubble and by means of the top or cover serving as the focusing screen, without removing his eyes from one part of the instrument to the other, thereby greatly facilitating and expediting his work.

The level may be connected either with the body of the "view-finder" or with the camera in proper position to act as above described.

Other shaped levels may be employed so long as the air bubble serves to indicate a horizontal plane and the top or cover thereof serves as the screen of the "view-finder."

The "view-finder" is otherwise constructed in any ordinary manner.

My invention is illustrated in the accompanying drawings, in which—

Figure 1:
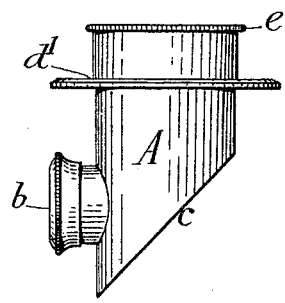
Figure 2:
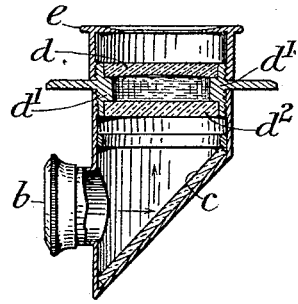
Figure 3:
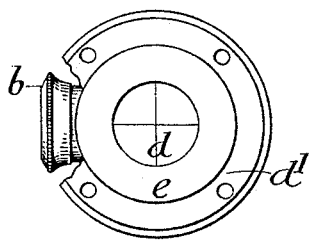
Figure 4:
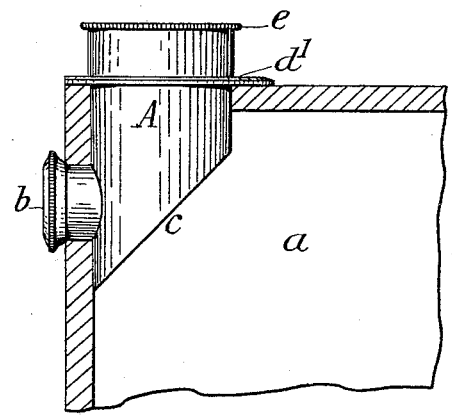
Figure 6:
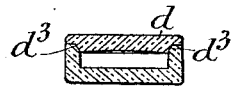
Figure 5:
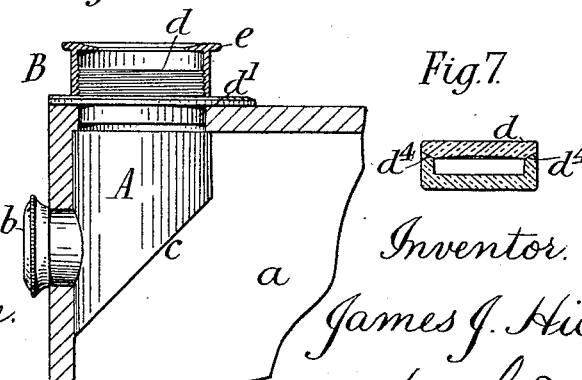
Figure 7:

Figure 1 is a side elevation. Fig. 2 is a vertical section and Fig. 3 is a plan, of a combined "view-finder" and level for a camera. Fig. 4 is a section of one corner of a camera showing fixed in position therein a combined "view-finder" and level of the construction shown at Figs. 1, 2, and 3. Fig. 5 is a similar view to Fig. 4, except that the "view-finder" and level consist of two separate parts fixed to the camera in proper relation with each other, and Figs. 6 and 7 are cross sections showing modified constructions of the screen and level.

$a$ is the body of the camera, $b$ is the "view-finder" lens, and $c$ is the reflector, both of which are in common use.

$d$ is the "view-finder" screen and $e$ is a screen or cover for excluding interfering lights from the screen $d$. Instead, however, of the view-finder screen $d$ consisting, as heretofore, of a simple piece of ground glass fixed at or over the upper end of the view-finder body A, I, according to my present invention, construct it to form the upper part of a level, preferably circular, whose body $d'$ is, according to the arrangements shown at Figs. 1 to 5, of metal, and whose bottom $d^2$ is of transparent flat glass. The view-finder screen $d$ is ground slightly concave on the under side to facilitate the motion of the air bubble, and it has also a "ground" or unpolished under surface to receive the view. The parts $d$ $d^2$ are cemented in position in seats formed in the body $d'$.

In the arrangement shown at Figs. 1 to 4, the view-finder and level are both fitted to the body A and can be handled as a single instrument, but in the arrangement shown at Fig. 5 the view-finder lens $b$ and reflector $c$ are fitted to the body A, while the level and view-finder screen are combined in a body B, to which the light screen $e$ is also attached; the bodies A and B are so fixed to the camera $a$ as to bring the level and view-finder screen immediately over the reflector in the position ordinarily occupied by the reflector and screen of an ordinary view-finder.

Instead of making the level and view-finder screen, as above shown and described, partly of metal and partly of glass, they may be made wholly of glass as shown at Figs. 6 and 7, in both of which examples the bottom portion is of dish form and, as shown at Fig. 6, has a slightly conical mouth $d^3$, or, as shown at Fig. 7, it has a seat $d^4$ to receive a suitably shaped plano-concave top or cover $d$ forming the view-finder screen, ground to fit therein or thereon and cemented in position.

In the arrangements above described the level and view-finder screen are supposed to be of circular form, but, if desired, they may be of rectangular form.

Having fully described my invention, what I desire to claim, and secure by Letters Patent, is—

1. The combination with the body $a$, of a view-finder lens $b$, a reflector $c$, and a transparent level, the top $d$ of which forms the screen of the view-finder, substantially as herein shown and described and for the purpose stated.

2. The combination with the body of the camera, of a combined view-finder and level constructed and arranged substantially as herein shown and described and for the purpose stated.

3. The combination with the body $a$, of a view-finder whose screen $d$ forms the top of a transparent level, substantially as herein shown and described and for the purpose stated.

JAS. J. HICKS.

Witnesses:
B. J. B. MILLS,
CLAUDE K. MILLS,
23 Southampton Buildings, London, England.